US010081294B2

(12) United States Patent
Ahn et al.

(10) Patent No.: US 10,081,294 B2
(45) Date of Patent: Sep. 25, 2018

(54) LIGHTING APPARATUS FOR A VEHICLE

(71) Applicant: HYUNDAI MOTOR COMPANY, Seoul (KR)

(72) Inventors: Byoung Suk Ahn, Gwacheon-si (KR); Jik Soo Shin, Incheon (KR); Keon Soo Jin, Ulsan (KR); Jung Wook Lim, Seoul (KR); Ki Hong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/374,848

(22) Filed: Dec. 9, 2016

(65) Prior Publication Data

US 2018/0099605 A1    Apr. 12, 2018

(30) Foreign Application Priority Data

Oct. 10, 2016   (KR) .................. 10-2016-0130464

(51) Int. Cl.
| | |
|---|---|
| *B60Q 1/076* | (2006.01) |
| *F21S 8/10* | (2006.01) |
| *F21S 41/25* | (2018.01) |
| *F21S 41/63* | (2018.01) |
| *F21S 41/29* | (2018.01) |

(Continued)

(52) U.S. Cl.
CPC ............. *B60Q 1/076* (2013.01); *F21S 41/25* (2018.01); *F21S 41/295* (2018.01); *F21S 41/30* (2018.01); *F21S 41/635* (2018.01); *F21S 41/675* (2018.01); *F21S 48/125* (2013.01); *F21S 48/1216* (2013.01); *F21S 48/13* (2013.01); *F21S 48/1721* (2013.01); *F21S 48/1757* (2013.01); *B60Q 2400/50* (2013.01)

(58) Field of Classification Search
CPC . B60Q 1/076; B60Q 2400/50; F21S 48/1216; F21S 48/125; F21S 48/13; F21S 48/1721; F21S 48/1757
See application file for complete search history.

(56) References Cited

U.S. PATENT DOCUMENTS

| | | | |
|---|---|---|---|
| 6,497,503 B1 * | 12/2002 | Dassanayake | B60Q 1/085 362/276 |
| 7,690,825 B2 * | 4/2010 | Kuwahara | B60Q 1/12 362/272 |

(Continued)

FOREIGN PATENT DOCUMENTS

| | | | | |
|---|---|---|---|---|
| FR | 2793001 A1 * | 11/2000 | | B60Q 1/12 |
| JP | 6022881 | 6/1994 | | |

(Continued)

OTHER PUBLICATIONS

KR Office Action dated Oct. 25, 2017, Office Action in corresponding Korean Patent Application 10-2016-0130464, dated Oct. 25, 2017, 6 pages.

*Primary Examiner* — Mary Ellen Bowman
(74) *Attorney, Agent, or Firm* — Lempia Summerfield Katz LLC

(57) ABSTRACT

The present disclosure provides a lighting apparatus for a vehicle that makes information images to be shown in a low-beam area clear by showing information on a road with high visibility using light for a high beam and that has a small layout by showing information on a road using the function of a high beam and is manufactured at a low manufacturing cost with a small weight.

6 Claims, 5 Drawing Sheets

(51) Int. Cl.
  *F21S 41/30*   (2018.01)
  *F21S 41/675*  (2018.01)

(56) References Cited

U.S. PATENT DOCUMENTS

| | | | | |
|---|---|---|---|---|
| 7,815,352 | B2* | 10/2010 | Naganawa | B60Q 1/085 |
| | | | | 362/465 |
| 8,602,618 | B2* | 12/2013 | Ahn | F21S 48/1127 |
| | | | | 362/465 |
| 2005/0237759 | A1* | 10/2005 | Natchoo | F21S 48/1778 |
| | | | | 362/512 |
| 2016/0109100 | A1 | 4/2016 | Kim | |

FOREIGN PATENT DOCUMENTS

| | | |
|---|---|---|
| JP | 2008-123856 | 5/2008 |
| KR | 100187812 | 6/1999 |
| KR | 20020055084 | 7/2002 |
| KR | 1020090096994 | 9/2009 |
| KR | 10-2012-0054159 | 5/2012 |
| KR | 20160047060 | 5/2016 |

\* cited by examiner

LIGHTING APPARATUS FOR A VEHICLE

CROSS REFERENCE TO RELATED APPLICATION

The present application claims priority to and the benefit of Korean Patent Application No. 10-2016-0130464, filed Oct. 10, 2016, the entire contents of which is incorporated herein by reference.

BACKGROUND

Field of the Disclosure

The present disclosure relates to a lighting apparatus for a vehicle that shows information on a road using a high beam.

Description of the Related Art

In general, vehicles are equipped with lighting systems for more clearly showing objects in front of the vehicles at night and helping drivers of other vehicles or pedestrians notice the vehicles. A headlamp, also called a headlight, is a light for irradiating, i.e., illuminating the road in front of a vehicle.

Recently, operating a steering wheel and headlamps together using the function of an adaptive headlamp has been implemented. Likewise, adjusting the radiation or emitting angle upward and downward in accordance with the height of a vehicle has also been applied to headlamps. Further, an image containing driving information may be projected on a road when a vehicle runs at low speeds.

However, a plurality of pixel lights are required to use an adaptive headlamp. When a single pixel light is provided, the single pixel light is required to divide light to show information on a road, so the intensity of the light decreases. Accordingly, a dim image is projected on a road, so visibility decreases and other drivers or pedestrians cannot recognize the information projected on the road.

The description provided above as a related art of the present disclosure is only for enhancement of understanding the background of the present disclosure and should not be construed as being included in the related art known by those skilled in the art.

SUMMARY

The present disclosure is directed to a lighting apparatus for a vehicle. The disclosed lighting apparatus for a vehicle makes information images to be shown in a low-beam area clear by showing information on a road using light for a high beam. The disclosed lighting apparatus for a vehicle further has a small layout by showing information on a road using the function of a high beam. The disclosed lighting apparatus for a vehicle is also manufactured at a low manufacturing cost with a small weight.

In order to achieve the objects of the present disclosure, a lighting apparatus for a vehicle may include: an optical module mounted on a vehicle or car body so as to be able to tilt. The optical module may have a light source. The lighting apparatus may also have a variable reflection unit disposed on the optical module and receiving and reflecting light from the light source such that the light is changed into a specific image. The lighting apparatus may also have a projective lens disposed on the optical module, receiving and transmitting the light reflected by the variable reflection unit to the outside. The projective lens may have a variable focus. The lighting apparatus may also have a tilting adjuster fixed to the car body, connected to the optical module, and adjusting a tilting angle of the optical module so that the light traveling through the projective lens is radiated as a high beam or onto the road. The lighting apparatus may also have a focus adjuster connected to the projective lens to adjust the focus of the projective lens and adjusting the focus of the projective lens when the optical module is tilted by the tilting adjuster and radiates the light.

The optical module may be hinged to the car body to tilt up and/or down.

The tilting adjuster may not be operated when a high beam is radiated, so that the initial orientation of the optical module is maintained. The tilting adjuster may be operated so that the optical module is tilted downward when light is to be radiated onto the road.

The tilting adjuster may be composed of an actuating motor that is fixed to the car body and a moving rod that is moved in a forward direction and a backward direction by the actuating motor. The optical module may be connected to the moving rod so that when the actuating motor is operated, the moving rod may be moved and the optical module may be correspondingly tilted.

The variable reflection unit may be a digital micro-mirror device (DMD) composed of a plurality of micro-reflectors that are turned on/off in response to an operation signal to change angles so that a path of incident light is changed.

The focus adjuster may include an actuator on the optical module and a rotary rod extending in a front-rear direction from the actuator and rotating when the actuator operates. The projective lens may be thread-fastened to the rotary rod to move forward and backward on the rotary rod when the actuator operates.

The projective lens may include a plurality of lenses. Any one of the lenses may be connected to the focus adjuster and moved forward and backward, whereby the focus may be adjusted.

According to the lighting apparatus for a vehicle having the structure described above, since information is shown on a road by light that is used as a high beam, the information image shown in a low-beam area is made clear, thereby improving visibility. Further, information is shown on a road by a high-beam function, so the layout is reduced, thereby reducing the manufacturing cost and weight.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

A lighting apparatus for a vehicle according to an embodiment of the present disclosure is described hereafter with reference to the accompanying drawings.

Figure 1:
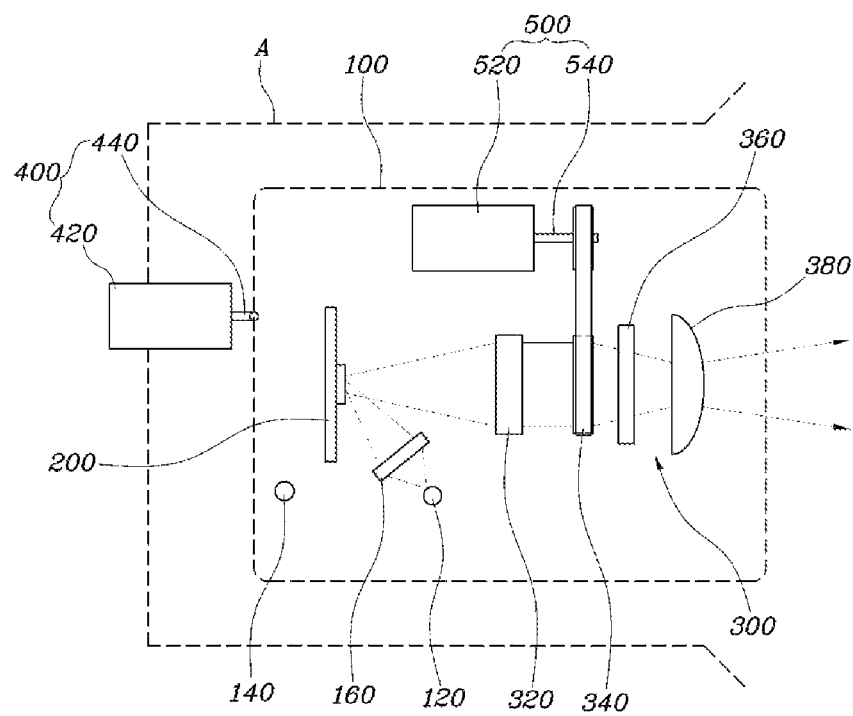
FIG. 1 is a view showing a lighting apparatus for a vehicle according to an embodiment of the present disclosure.
Figure 2:
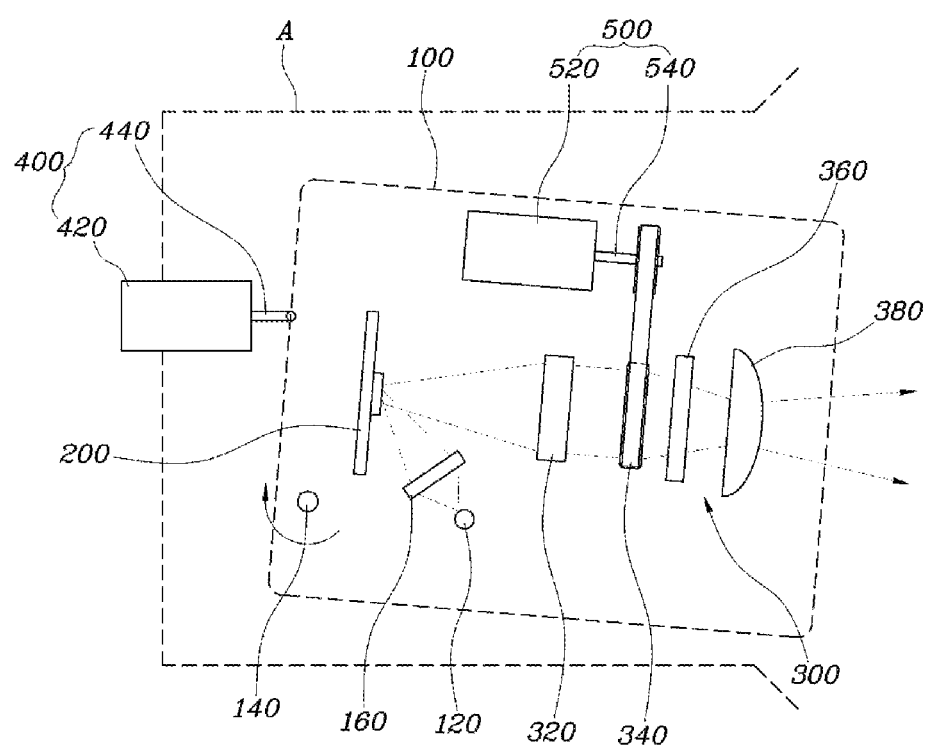
FIGS. 2 and 3 are views illustrating the operation of the lighting apparatus for a vehicle shown in FIG. 1.
Figure 3:
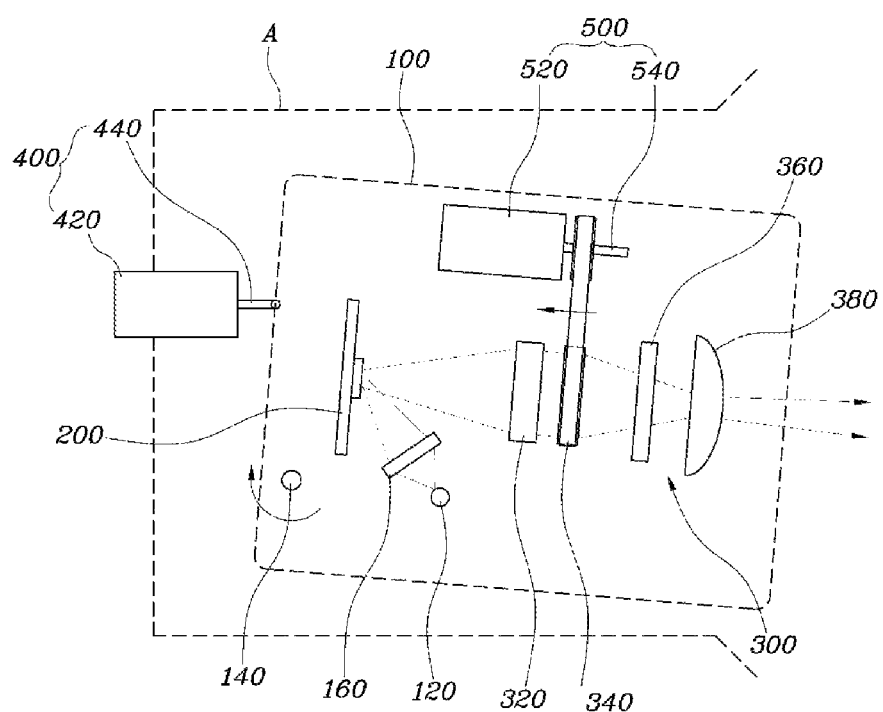
Figure 4:
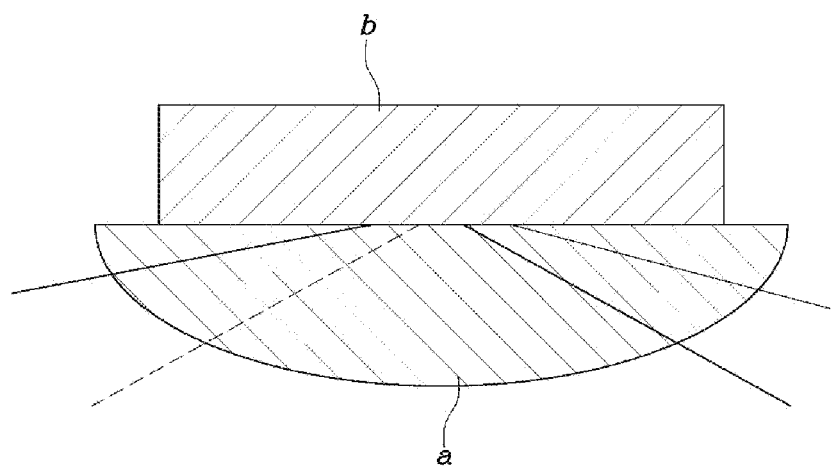
FIG. 4 is a view showing the operation for generating a high beam of the lighting apparatus for a vehicle shown in FIG. 1.
Figure 5:
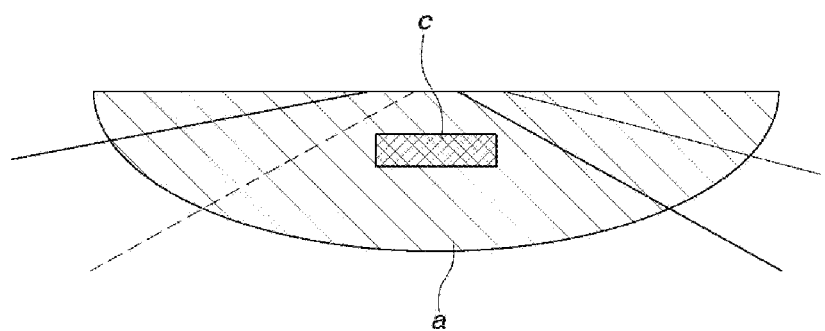
FIG. 5 is a view showing road information projected by the lighting apparatus for a vehicle shown in FIG. 1.

FIG. 1 is a view showing a lighting apparatus for a vehicle according to an embodiment of the present disclosure. FIGS. 2 and 3 are views illustrating the operation of the lighting apparatus for the vehicle shown in FIG. 1. FIG. 4 is a view showing the operation for generating a high beam of the lighting apparatus for the vehicle shown in FIG. 1. FIG. 5 is a view showing road information projected by the lighting apparatus for the vehicle shown in FIG. 1.

In this embodiment, a lighting apparatus for a vehicle according to the present disclosure, as shown in FIG. 1, includes: an optical module 100 mounted on a vehicle or car body A able to be tilted and having a light source 120. The lighting apparatus also has a variable reflection unit 200 disposed on the optical module 100, receiving and reflecting light from the light source 120 such that the light is changed into a specific image. The lighting apparatus also has a projective lens 300 disposed on the optical module 100, receiving and transmitting the light reflected by the variable reflection unit 200 to the outside. The projective lens 300 has a variable focus. The lighting apparatus also has a tilting adjuster 400 fixed to the car body A and connected to the optical module 100, adjusting the tilting angle of the optical module 100 so that the light traveling through the projective lens 300 is radiated as a high beam or onto the road. The lighting apparatus also has a focus adjuster 500 connected to the projective lens 300 to adjust the focus of the projective lens 300 for adjusting the focus of the projective lens 300 when the optical module 100 is tilted by the tilting adjuster 400 and radiates light.

As described above, the lighting apparatus of the present disclosure includes the optical module 100, the variable reflection unit 200, the projective lens 300, the tilting adjuster 400, and the focus adjuster 500. In this embodiment, the optical module 100 is mounted on the car body A and can be tilted. The optical module 100 is coupled to a pivot hinge 140 to tilt up and/or down on the car body A, so that it can tilt about the pivot hinge 140. The optical module 100 may be one housing.

The light source 120 is disposed in the optical module 100. The light source 120 may be an LED or a laser. The light from the optical source 120 may be radiated to the variable reflection unit 200 through a specific condensing lens 160.

In this embodiment, the variable reflection unit 200 is positioned on the path of the light from the optical source 120 inside the optical module 100 so that the light from the light source 120 is reflected unchanged or is changed into a specific image and then reflected. In other words, when light is reflected by the variable reflection unit 200 unchanged, the light can be radiated as a high beam. When the light is changed into a specific image showing road information and then reflected, the light can be radiated as the road information to thus be radiated on a low-beam area. The variable reflection unit 200 may be a DMD composed of a plurality of micro-reflectors that are turned on/off in response to an operation signal to change angles so that the path of incident light is changed. As the variable reflection unit 200 is turned on/off, the angles of the micro-reflectors are changed, so that the path of light can be changed and the angles of the micro-reflectors can be controlled by a motor. In other words, according to the variable reflection unit 200, the micro-reflectors are changed in angle when turned on/off so the light from the light source 120 is reflected unchanged, or the micro-reflectors are turned on/off in accordance with road information to be shown, whereby they can create a specific image.

The light reflected by the variable reflection unit 200 travels to the projective lens 300 and the light travels outward as a high beam or onto the road. In particular, one light source 120 is used to generate a high beam and show road information in the present disclosure. The distances that the light travels when a high beam is generated and when road information is shown are different, so the projective lens 300 has a variable focus so that the focus can be appropriately adjusted to generate a high beam or show road information.

In this embodiment, the tilting angle of the optical module 100, which can be tilted on the car body A, is determined by the tilting adjuster 400. The focus of the projective lens 300 is changed by the focus adjuster 500. In other words, when a high beam is radiated, the tilting adjuster 400 is not operated and the initial position of the optical module 100 is maintained. The light from the light source 120 is reflected by the variable reflection unit 200 and then radiated as a high beam through the projective lens 300. All of the light from the light source 120 is sent to the projective lens 300 by the variable reflection unit 200, so a sufficient quantity of light is secured. Thus the light is sufficiently radiated as a high beam.

In this state, in order to radiate light for showing information on a road, the tilting adjuster 400 is operated and the optical module 100 is tilted down. The light from the light source 120 is finally radiated in a low-beam area on a road. In this process, the variable reflection unit 200 reflects the light from the light source 120 to realize a specific image corresponding to road information, and the focus adjuster 500 adjusts the focus of the projective lens 300. Accordingly, since a high beam is generated by one light source 120 and information is shown on the road by the tilting adjuster 400 and the focus adjuster 500, the entire layout is reduced and a clear image is shown in on the road.

In this embodiment, according to the preset disclosure, the tilting adjuster 400, as shown in FIG. 1, includes an actuating motor 420 that is fixed to the car body A and a moving rod 440 that is moved forward and backward by the actuating motor 420. The optical module 100 is connected to the moving rod 440, so when the actuating motor 420 is operated, the moving rod 440 is moved, and accordingly, the optical module 100 can be tilted. The tilting adjuster 400 includes the actuating motor 420 and the moving rod 440, as described above. The actuating motor 420 is controlled by an electronic control unit (ECU). In other words, when the actuating motor 420 pushes the moving rod 440 in response to an operation signal based on a determination that it is required to show road information, the moving rod 440 pushes the optical module 100, so the optical module 100 tilts on the car body A. To this end, the pivot hinge 140 of the optical module 100 may be disposed at a lower area, and the moving rod 440 may be connected to the upper portion of the optical module 100, so the optical module 100 can smoothly tilt.

According to the present embodiment, the tilting adjuster 400 may further include an operating member such as a solenoid, rather than the actuating motor 420 and the moving rod 440.

In this embodiment, the focus adjuster 500 includes an actuator 520 on the optical module 100 and a rotary rod 540 that extends in the front-rear direction from the actuator 520 and rotates when the actuator 520 operates. The projective lens 300 is thread-fastened to the rotary rod 540 so it can move longitudinally, in a forward direction and backward direction on the rotary rod 540 when the actuator 520 operates. The focus adjuster 500 includes the actuator 520 and the rotary rod 540, as described above. The actuator 520 is controlled by the ECU. In other words, when the actuator 520 rotates the rotary rod 540 in response to an operation signal based on a determination that it is necessary to show road information, the projective lens 300 moves longitudinally on the rotary rod 540. As the projective lens 300 is moved in the front-rear direction by the actuator 520 and the rotary rod 540, the imaging position of the light reflected by the variable reflection unit 200 changes and the focus is adjusted, so the image of the light radiated onto the road can be made clear.

In this embodiment, the projective lens 300 includes a plurality of lenses. Any one of the lenses is connected to the focus adjuster 500 and moved forward and backward, whereby the focus can be adjusted. In other words, the projective lens 300 may include a double lens 320, a first lens 340, a second lens 360, and an aspheric lens 380. Among these lenses, the double lens 320 may be a lens for correcting chromatic aberration, the first lens 340 and the second lens 360 may be provided to adjust the intensity and size of the light from the light source 120, and the aspheric lens 380 may be provided to correct distortion aberration of light. The first lens 340 or the second lens 360 is connected to the focus adjuster 500 to be moved forward and backward, whereby the focus of the projective lens 300 can be adjusted.

In this embodiment, the tilting adjuster 400 and the focus adjuster 500 may be operated with predetermined setting values to generate a high beam or show an image on a road.

The operation of the lighting apparatus of the present disclosure is described in further detail below.

In this embodiment, in the initial position is for generating a high beam. As shown in FIG. 1, the tilting adjuster 400 and the focus adjuster 500 are not operated, so the optical module 100 and the projective lens 300 are maintained at initial positions. Accordingly, as shown in FIG. 4, the light from the light source 120 is reflected without change by the variable reflection unit 200 and travels to a high-beam area 'b' through the projective lens 300. In this process, all of the light from the light source 120 is sent to the projective lens 300 by the variable reflection unit 200, so a high beam with a sufficient quantity of light is obtained.

In this state, in order to show information on the road, the tilting adjuster 400 is operated and the optical module 100 is tilted down, as shown in FIG. 2. Since the light source 120, the variable reflection unit 200, and the projective lens 300 are all disposed on the optical module 100, they are tilted with the optical module 100. The light from the light source 120 is finally radiated to a low-beam area 'a'. In this process, the variable reflection unit 200 reflects the light from the light source 120 such that the light is changed into a specific image corresponding to road information.

Further, in this embodiment as shown in FIG. 3, when the tilting adjuster 400 starts operating, the focus adjuster 500 starts operating, so the focus of the projective lens 300 is adjusted. In other words, when the focus adjuster 500 operates and the projective lens 300 is moved, the focus of the projective lens 300, set for generating a high beam, is adjusted to be suitable for showing road information. As a result and as shown in FIG. 5, the road information 'c' shown in the low-beam area 'a' becomes more clear.

Accordingly, since a high beam is generated by one light source 120 and information is shown on the road by the tilting adjuster 400 and the focus adjuster 500, the entire layout is reduced and a clear image is shown on the road, thereby improving visibility.

According to the present disclosure, information is shown on a road using a high beam because a high beam is typically not frequently used at low speeds, so it is possible to radiate a clear image to the low-beam area. Further, in the case of a self-driving car, a clear image is shown in a low-beam area using a high-beam, so not only the passengers in the vehicle, but other vehicles and pedestrians around the vehicle can see the specific image on the road, so stable self-driving can be achieved.

Although the present disclosure was described with reference to specific embodiments shown in the drawings, it is apparent to those skilled in the art that the present invention may be changed and modified in various ways without departing from the scope of the present disclosure, which is described in the following claims.

What is claimed is:

1. A lighting apparatus for a vehicle, the lighting apparatus comprising:
    an optical module configured to be mounted on the vehicle to be able to tilt and having a light source;
    a variable reflection unit disposed on the optical module for receiving and reflecting light from the light source such that the light is changed into an image;
    a projective lens disposed on the optical module for receiving and transmitting the light reflected by the variable reflection unit to the outside, wherein the projective lens has a variable focus;
    a tilting adjuster configured to be fixed to the vehicle and connected to the optical module, wherein the tilting adjuster is configured for adjusting a tilting angle of the optical module so that the light traveling through the projective lens is radiated as a high beam or onto a road; and
    a focus adjuster connected to the projective lens to adjust a focus of the projective lens and adjust the focus of the projective lens when the optical module is tilted by the tilting adjuster and radiates light,
    wherein the optical module is configured to be coupled to a pivot hinge to tilt up, down, or up and down,
    wherein the tilting adjuster is disposed at an upper portion of the optical module and the pivot hinge is disposed at a lower area of the optical module, and
    wherein, when the tilting adjuster is not in operation, an initial position of the optical module is maintained when a high beam is radiated.

2. The lighting apparatus of claim 1, wherein the tilting adjuster includes an actuating motor that is configured to be fixed to the vehicle and a moving rod that is movable in a forward direction and a backward direction by the actuating motor, and
    wherein the optical module is connected to the moving rod such that when the actuating motor is operated, the moving rod is moved and the optical module is correspondingly tilted.

3. The lighting apparatus of claim 1, wherein the variable reflection unit is a Digital Micro-mirror Device (DMD) composed of a plurality of micro-reflectors that are turned on, turned off, or turned on and off in response to an operation signal to change angles so that a path of incident light is changed.

4. The lighting apparatus of claim 1, wherein the focus adjuster includes an actuator on the optical module and a rotary rod extending in a front-rear direction from the actuator and rotating when the actuator operates, and
    wherein the projective lens is thread-fastened to the rotary rod to move in a forward direction and a backward direction on the rotary rod when the actuator operates.

5. The lighting apparatus of claim 1, wherein the projective lens includes a plurality of lenses and any one of the lenses is connected to the focus adjuster and movable in a forward direction and a backward direction to adjust the focus.

6. The lighting apparatus of claim 1, wherein when the tilting adjuster is operated, the optical module is tilted downward when light is radiated onto the road.

* * * * *